(12) United States Patent
Huang et al.

(10) Patent No.: US 11,701,589 B2
(45) Date of Patent: Jul. 18, 2023

(54) DRIFT METHOD AND APPARATUS FOR VIRTUAL VEHICLE IN VIRTUAL WORLD AND STORAGE MEDIUM

(71) Applicant: TENCENT TECHNOLOGY (SHENZHEN) COMPANY LIMITED, Guangdong (CN)

(72) Inventors: Xiong Fei Huang, Shenzhen (CN); Jing Liu, Shenzhen (CN)

(73) Assignee: TENCENT TECHNOLOGY (CHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/672,968

(22) Filed: Feb. 16, 2022

(65) Prior Publication Data

US 2022/0168645 A1 Jun. 2, 2022

Related U.S. Application Data

(63) Continuation of application No. 17/173,272, filed on Feb. 11, 2021, now Pat. No. 11,344,810, which is a (Continued)

(30) Foreign Application Priority Data

Nov. 28, 2018 (CN) .......................... 201811433526.3

(51) Int. Cl.
  *A63F 13/57* (2014.01)
  *A63F 13/42* (2014.01)
  *A63F 13/803* (2014.01)

(52) U.S. Cl.
  CPC ............. *A63F 13/57* (2014.09); *A63F 13/42* (2014.09); *A63F 13/803* (2014.09); *A63F 2300/64* (2013.01); *A63F 2300/8017* (2013.01)

(58) Field of Classification Search
  CPC ........ A63F 13/42; A63F 13/422; A63F 13/57; A63F 13/803; A63F 2300/64; A63F 2300/8017
  See application file for complete search history.

(56) References Cited

U.S. PATENT DOCUMENTS 5,755,620 A  5/1998 Yamamoto
6,171,186 B1  1/2001 Kurosawa et al.
(Continued)

FOREIGN PATENT DOCUMENTS

CN  104054118 A  9/2014
CN  105718065 A  6/2016
(Continued)

OTHER PUBLICATIONS

"Forza Horizon 4: Beginner's Guide to Drifting part 1," by RBX, published Jan. 3, 2021. Source:https://www.youtube.com/watch?v=U6m0jYqk0YA (Year: 2021).*
(Continued)

*Primary Examiner* — Steven J Hylinski
(74) *Attorney, Agent, or Firm* — Sughrue Mion, PLLC

(57) ABSTRACT

A drift method for a virtual vehicle in a virtual world is disclosed, including: receiving an operation start event with respect to a target interaction control that is provided on a user interface of an application while a virtual vehicle in a virtual world in the application is in a normal traveling state; controlling, according to the operation start event, the virtual vehicle to enter a drift state in the virtual world; and after an operation end event with respect to the target interaction control is received, controlling the virtual vehicle to remain in the drift state based on an angle between a vehicle head direction and a traveling direction being greater than or equal to a first threshold.

20 Claims, 10 Drawing Sheets

Related U.S. Application Data continuation of application No. PCT/CN2019/115519, filed on Nov. 5, 2019.

(56) References Cited

U.S. PATENT DOCUMENTS

| | | | |
|---|---|---|---|
| 9,687,741 | B1 | 6/2017 | Kim et al. |
| 10,449,451 | B2 | 10/2019 | Utsugi |
| 10,946,277 | B2 | 3/2021 | Liu et al. |
| 11,071,911 | B2 * | 7/2021 | Yabuki .................. A63F 13/426 |
| 11,135,513 | B2 | 10/2021 | Li et al. |
| 2001/0021667 | A1 | 9/2001 | Fujimoto et al. |
| 2007/0269054 | A1 | 11/2007 | Takagi et al. |
| 2008/0218529 | A1 | 9/2008 | Okubo et al. |
| 2013/0137514 | A1 | 5/2013 | Ichimura |
| 2019/0336860 | A1 | 11/2019 | Yabuki et al. |
| 2019/0336863 | A1 | 11/2019 | Hayashi et al. |
| 2020/0078668 | A1 | 3/2020 | Yabuki et al. |
| 2020/0086209 | A1 | 3/2020 | Yabuki et al. |
| 2020/0086214 | A1 | 3/2020 | Yabuki et al. |
| 2021/0008445 | A1 | 1/2021 | Hayashi et al. |
| 2021/0245053 | A1 | 8/2021 | Weng et al. |

FOREIGN PATENT DOCUMENTS

| | | | | |
|---|---|---|---|---|
| CN | 106861186 | A * | 6/2017 | ......... A63F 13/5375 |
| CN | 106861186 | A | 6/2017 | |
| CN | 108553893 | A * | 9/2018 | ............. A63F 13/42 |
| CN | 108553893 | A | 9/2018 | |
| CN | 109513210 | A | 3/2019 | |
| JP | 7-116353 | A | 5/1995 | |
| JP | 2007-91104 | A | 4/2007 | |
| JP | 2008-256737 | A | 10/2008 | |

OTHER PUBLICATIONS

"Forza Horizon 4," Google Search result, accessed Oct. 18, 2021 (Year: 2021).*

Translation of the Written Opinion of the International Searching Authority dated Jan. 31, 2020 in International Application PCT/CN2019/115519.

Communication dated Feb. 21, 2022 from the Japanese Patent Office in Japanese Application No. 2021-504418.

FC2, 2009, Retrieved from: URL: <fascinationworld.web.fc2.com/supamariokato.htm> (10 pages total).

"A collection of techniques that can be used with Mario Kart 8 Deluxe! Tips for running fast", Gamepedia, 2017, Retrieved from: URL: <https://gamepedia.jp/archives/7118#i-3> (9 pages total).

"# 2 Drift Operation method (1)—Practice Method for improving Mario Kart", Youtube, Timestamps 4:38 to 4:53, 2017, Retrieved from: URL: <https://www.youtube.com/watch?v=7U-gEDJTpKU> (1 page total).

First Office Action of CN 201811433526.3 dated Dec. 16, 2019.

International Search Report of PCT/CN2019/115519 dated Jan. 31, 2020 [PCT/ISA/210].

Second Office Action of CN 201811433526.3 dated May 20, 2020.

Third Office Action ofCN 201811433526.3 dated Sep. 15, 2020.

Written Opinion of PCT/CN2019/115519 dated Jan. 31, 2020 [PCT/ISA/237].

"Forza 6 Drifting Guide For Beginners: Everything You need to Get Sideways," published Jan. 10, 2016. Source: xboxracingpro.com/drifting-in-forza/ (Year: 2016).

"How to Drift," excerpt from Gran Turismo 6 Manual, copyright 2016 by Sony Interactive Entertainment. Source: www.gran-turismo.com/us/gt6/manual/arcade/howtodrift.html (Year: 2016).

"Mario Kart 8 Deluxe Tips: Drifting to Win," by Chris Carter, published Apr. 28, 2017. Source: https://www.polygon.com/mario-kart-8-deluxe-guide/2017/4/28/15458834/tips-drifting-ultra-mini-turbo (Year: 2017).

"The Technicalities of Absolute Drifting, aka. How to Stop Hitting Walls," by A. Tomato, published Jul. 10, 2016. Source: https://steamcommunity.com/sharedfiles/filedetails/?id=720312667 (Year: 2016).

"The 9 Best Games for Digital Drifting," by Jordan Butters, Published 2017. Source: https://drivetribe.com/p/the-9-best-games-for-digital-drifting-UadZPBx9Tj-UvblRd3kbbA?iid=e-2cYTdSTJq406NM-HvLAg (Year: 2017).

https://zhidao.baidu.com/question/1733682089417187987.html published May 16, 2015.

https://www.bilibili.com/video/av22230397?from=search&seid=14432702735337081326 published Apr. 17, 2018.

https://www.bilibili.com/video/av32606749 published Sep. 27, 2018.

"[KartRider Rush Plus] Android Game Recommendation", Engineer Warehouse, Jul. 2, 2012 (19 pages total), Accessed via the Internet: https://m.blog.naver.com/PostView.naver?isHttpsRedirect=true&blogId=onamjuo&logNo=161067658.

"[Positive person] Drift course for beginners in Kartrider, step by step from 1 to 10", YouTube online video published Oct. 7, 2017 (1 page total), Accessed via the Internet: https://www. youtube.com/watch?v=BNQGNVXoYMM.

Office Action dated Mar. 10, 2023 in Korean Application No. 10-2021-7010649.

* cited by examiner

DRIFT METHOD AND APPARATUS FOR VIRTUAL VEHICLE IN VIRTUAL WORLD AND STORAGE MEDIUM

CROSS-REFERENCE TO RELATED APPLICATION(S)

This application is a Continuation Application of U.S. application Ser. No. 17/173,272 filed Feb. 11, 2021, which is a bypass continuation application of International Application No. PCT/CN2019/115519, filed on Nov. 5, 2019, which claims priority to Chinese Patent Application No. 201811433526.3, entitled "DRIFT METHOD AND APPARATUS FOR VIRTUAL VEHICLE IN VIRTUAL WORLD AND STORAGE MEDIUM" and filed with the National Intellectual Property Administration, PRC on Nov. 28, 2018, the disclosures of which are herein incorporated by reference in their entireties.

FIELD

The disclosure relates to the field of computer programs, and in particular, to a drift method and apparatus for a virtual vehicle in a virtual world and a storage medium.

BACKGROUND

Automobile racing games are a type of games popular with users. Currently, three-dimensional automobile racing games built in a three-dimensional virtual world are provided.

In the related art, a user generally uses a smartphone to run an automobile racing game application. In the running process, a user interface of the automobile racing game application is displayed on the smartphone. The user interface includes a traveling picture of a racing automobile traveling in a track in a virtual world, and a left direction key, a right direction key, and a drift control overlaying the traveling picture. If the user presses a direction key first, and then presses the drift control, the automobile racing game application controls, according to the press operation performed by the user, the racing automobile to enter a drift state.

In the related art, the user needs to simultaneously press a direction key and the drift control key in order to trigger a drift of the racing automobile and hold the drift state of the racing automobile, which requires cumbersome man-machine interaction operations, and is not conducive for the user to operate quickly in scenarios such as when the user is in a subway or a bus. Once an event occurs, such as a collision or a wobble occurring in the subway or the bus, the drift process of the racing automobile in the game application is likely to be accidentally interrupted.

SUMMARY

Embodiments of the disclosure provide a drift method and apparatus for a virtual vehicle in a virtual world and a storage medium.

According to an aspect of an example embodiment, provided is a drift method for a virtual vehicle in a virtual world, performed by a terminal including at least one processor, the method including: receiving an operation start event with respect to a target interaction control that is provided on a user interface of an application while a virtual vehicle in a virtual world in the application is in a normal traveling state; controlling, according to the operation start event, the virtual vehicle to enter a drift state in the virtual world; and after an operation end event with respect to the target interaction control is received, controlling the virtual vehicle to remain in the drift state based on an angle between a vehicle head direction and a traveling direction being greater than or equal to a first threshold.

The controlling the virtual vehicle to remain in the drift state may include: increasing a dynamic drift-holding traction on the virtual vehicle along the vehicle head direction, the dynamic drift-holding traction being used for controlling the virtual vehicle to remain in the drift state.

A magnitude of the dynamic drift-holding traction may be in a positive correlation with a speed of the virtual vehicle in a preset speed range.

The method may further include: changing a ground friction of the virtual vehicle from a first friction value to a second friction value based on the angle between the vehicle head direction and the traveling direction being greater than or equal to the first threshold after the operation end event corresponding to the target interaction control is received, the first friction value being greater than the second friction value.

The method may further include: continuously increasing an attribute value of the virtual vehicle during the drift state; activating an acceleration control of the virtual vehicle on the user interface based on the attribute value reaching a trigger threshold; and based on a trigger signal with respect to the acceleration control being received, controlling the virtual vehicle to accelerate.

The method may further include: based on the angle between the vehicle head direction and the traveling direction being less than the first threshold while the virtual vehicle is in the drift state, controlling the virtual vehicle to restore the normal traveling state.

The controlling the virtual vehicle to restore the normal traveling state may include: switching a dynamic drift-holding traction of the virtual vehicle to a normal traveling traction, the dynamic drift-holding traction being used for controlling the virtual vehicle to remain in the drift state and the normal traveling traction being used for controlling the virtual vehicle to enter the normal traveling state, and the dynamic drift-holding traction being greater than the normal traveling traction.

The method may further include: changing a ground friction of the virtual vehicle from a second friction value to a first friction value based on the angle between the vehicle head direction and the traveling direction being less than the first threshold while the virtual vehicle is in the drift state, the second friction value being a friction value at which the virtual vehicle remains in the drift state, and the first friction value being greater than the second friction value.

The method may further include: receiving a direction control operation; changing the vehicle head direction of the virtual vehicle according to the direction control operation; and determining an angle between the changed vehicle head direction and the traveling direction.

The method may further include: after the operation end event corresponding to the target interaction control is received, controlling the virtual vehicle to switch from the drift state to the normal traveling state upon a lapse of a target duration, based on the angle between the vehicle head direction and the traveling direction being less than a second threshold, the second threshold being less than the first threshold.

The controlling the virtual vehicle to switch from the drift state to the normal traveling state upon the lapse of the target duration may include: calculating, according to a speed of the virtual vehicle and a ground friction on the virtual vehicle, a decay duration during which the virtual vehicle transitions from the drift state to the normal traveling state; controlling, based on the decay duration being greater than or equal to a shortest drift duration, the virtual vehicle to transition from the drift state to the normal traveling state according to the decay duration; and controlling, based on the decay duration being less than the shortest drift duration, the virtual vehicle to transition from the drift state to the normal traveling state according to the shortest drift duration.

According to an aspect of an example embodiment, provided is a drift apparatus for a virtual vehicle in a virtual world, including: at least one memory configured to store program code; and at least one processor configured to read the program code and operate as instructed by the program code, the program code including: interaction code configured to cause at least one of the at least one processor to receive an operation start event with respect to a target interaction control that is provided on a user interface of an application while a virtual vehicle in a virtual world in the application is in a normal traveling state; and control code configured to cause at least one of the at least one processor to control, according to the operation start event, the virtual vehicle to enter a drift state in the virtual world, the control code being further configured cause at least one of the at least one processor to, after an operation end event with respect to the target interaction control is received, control the virtual vehicle to remain in the drift state based on an angle between a vehicle head direction and a traveling direction being greater than or equal to a first threshold.

The control code may be further configured to cause at least one of the at least one processor to increase a dynamic drift-holding traction on the virtual vehicle along the vehicle head direction based on the angle between the vehicle head direction and the traveling direction being greater than the first threshold after the operation end event corresponding to the target interaction control is received, the dynamic drift-holding traction being used for controlling the virtual vehicle to remain in the drift state.

The control code may be further configured to cause at least one of the at least one processor to change a ground friction of the virtual vehicle from a first friction value to a second friction value based on the angle between the vehicle head direction and the traveling direction being greater than or equal to the first threshold after the operation end event corresponding to the target interaction control is received, the first friction value being greater than the second friction value.

The control code may be further configured to cause at least one of the at least one processor to continuously increase an attribute value of the virtual vehicle during the drift state, activate an acceleration control of the virtual vehicle on the user interface based on the attribute value reaching a trigger threshold, and control the virtual vehicle to accelerate based on a trigger signal with respect to the acceleration control being received.

The control code may be further configured to cause at least one of the at least one processor to control the virtual vehicle to restore the normal traveling state, based on the angle between the vehicle head direction and the traveling direction being less than the first threshold while the virtual vehicle is in the drift state.

The control code may be further configured to cause at least one of the at least one processor to switch a dynamic drift-holding traction of the virtual vehicle to a normal traveling traction, the dynamic drift-holding traction being used for controlling the virtual vehicle to remain in the drift state and the normal traveling traction being used for controlling the virtual vehicle to enter the normal traveling state, and the dynamic drift-holding traction being greater than the normal traveling traction.

The control code may be further configured to cause at least one of the at least one processor to change a ground friction of the virtual vehicle from a second friction value to a first friction value based on the angle between the vehicle head direction and the traveling direction being less than the first threshold while the virtual vehicle is in the drift state, the second friction value being a friction value at which the virtual vehicle remains in the drift state, and the first friction value being greater than the second friction value.

According to an aspect of an example embodiment, provided is a terminal, including a processor and a memory, the memory storing computer-readable instructions, the computer-readable instructions, when being executed by the processor, causing the processor to perform operations in the foregoing method(s).

According to an aspect of an example embodiment, provided is a non-transitory computer-readable storage medium, storing computer-readable instructions, the computer-readable instructions, when executed by one or more processors, causing the one or more processors to perform: receiving an operation start event with respect to a target interaction control that is provided on a user interface of an application while a virtual vehicle in a virtual world in the application is in a normal traveling state; controlling, according to the operation start event, the virtual vehicle to enter a drift state in the virtual world; and after an operation end event with respect to the target interaction control is received, controlling the virtual vehicle to remain in the drift state based on an angle between a vehicle head direction and a traveling direction being greater than or equal to a first threshold.

BRIEF DESCRIPTION OF THE DRAWINGS

To describe the technical solutions of the example embodiments of the disclosure more clearly, the following briefly introduces the accompanying drawings for describing the example embodiments. Apparently, the accompanying drawings in the following description show merely some embodiments of the disclosure, and a person of ordinary skill in the art may still derive other drawings from the accompanying drawings without creative efforts.

DETAILED DESCRIPTION

To make the objectives, technical solutions, and advantages of the disclosure clearer, the following further describes implementations of the disclosure in detail with reference to the accompanying drawings.

The disclosure may be applied to the following scenarios.

An automobile racing game application refers to an application providing for one or more players to race in a same track. The application allows a racing automobile to enter a drift state during traveling. The drift state refers to a movement state in which a vehicle body slides through a turn in a case that a relatively large angle is generated between a vehicle head direction and a traveling direction. The application may be a standalone application or a network application. The application allows various competition manners such as individual racing, team racing, individual props, and team props. A racing automobile provided in the application may be at least one of a motorbike, a go-kart, a car, an electric vehicle, and a cartoon car.

A gunfight game application refers to an application providing for one or more players to perform a combat in an open game world. The application allows a game character to drive a military vehicle such as an infantry fighting vehicle, an armored personnel carrier, a scout car, a communication vehicle, a tracked vehicle, a tank, or an armored car in the open game world and control the military vehicle to enter a drift state while driving.

A sandbox game application refers to an open and creative application including one or more areas on a map and integrating various game elements such as action, shooting, fighting, and driving. The application allows a game character to drive various types of civilian cars in an open virtual world, and controls the cars to enter a drift state while driving.

A virtual vehicle in the related art is affected by, for example, a ground friction (and a wind resistance) in a virtual environment. When a drift operation performed by a user is canceled, the ground friction causes the virtual vehicle to decelerate rapidly, thereby canceling the drifting state, or even decelerating to zero.

Many current applications are developed based on smartphones or tablet computers. When a user uses a smartphone or a tablet computer to control a virtual vehicle on a transportation means, the virtual racing automobile is likely to be affected by factors such as a jolt and a collision in a real world, and therefore, the racing automobile cannot remain in a continuous drift state. The following embodiments are provided in the disclosure and may be used for resolving the foregoing technical problems.

Figure 1:
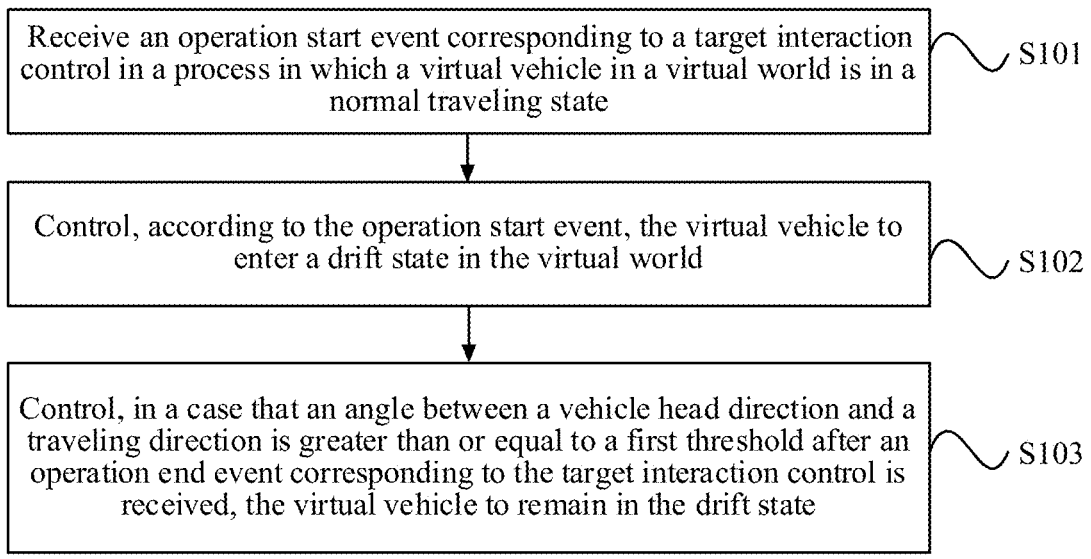
FIG. 1 is a flowchart of a drift method for a virtual vehicle in a virtual world according to an example embodiment of the disclosure.

FIG. 1 is a flowchart of a drift method for a virtual vehicle (or a method of controlling a drift state of a virtual vehicle) in a virtual world according to an example embodiment of the disclosure. This embodiment is described by using an example in which the method is applicable to a terminal running an application. The application is a program allowing a virtual vehicle to enter a drift state in a traveling process. The method includes operations 101-103:

Operation S101. Receive an operation start event corresponding to a target interaction control in a process in which a virtual vehicle in the virtual world is in a normal traveling state.

The application may be an automobile racing game application, an online game application, a mobile game application, or the like. The application is provided with a virtual world, and a virtual vehicle in the virtual world is provided. For illustrative purposes, an example in which the application is an automobile racing game application is used, and the virtual vehicle may be a racing automobile.

The virtual world is a three-dimensional virtual world constructed based on a three-dimensional virtual engine. The three-dimensional virtual world is provided with an environment constructed for the virtual vehicle to travel. The environment includes, for example, at least one of wildernesses, highways, tracks, and city streets.

A user interface is generated on the application and includes a traveling picture in which the virtual world is observed from a first perspective (e.g., a perspective of a driver or an interior perspective of a vehicle) or a third perspective of the virtual vehicle (e.g., a rear perspective of a vehicle or a far perspective), and a target interaction control overlaying the user interface. The target interaction control is a control or a set of controls configured to trigger a drift state of the virtual vehicle.

Operation S102. Control, according to the operation start event, the virtual vehicle to enter a drift state in the virtual world.

In some embodiments, the operation start event is triggered by a user operation on the target interaction control. Optionally, the target interaction control includes a direction control and a drift control displayed on a touch display screen. Alternatively, the target interaction control is a control corresponding to several physical modules on a racing automobile driving analog peripheral.

In some embodiments, the operation start event is triggered by a touch operation on the touch display screen, or may be triggered by a physical operation of controlling an external input device, for example, a physical operation of controlling a mouse, a VR handle, or the like.

In some embodiments, the user operation includes a tap operation, a combo operation, a long press operation, a slide operation, or the like. The type of the touch operation is not limited in this embodiment.

For example, the operation start event is generated in a case that a touch operation of simultaneously pressing a left direction key and a drift control starts to be performed by a user or is generated in a case that a touch operation of simultaneously pressing a right direction key and the drift control starts to be performed by the user.

The drift state refers to a movement state in which a vehicle body slides through a turn in a case that a relatively large angle is generated between a vehicle head direction and a traveling direction. The vehicle head direction refers to a direction directed to the front of the vehicle head. The traveling direction refers to a direction corresponding to a speed of the virtual vehicle during traveling, or an actual movement direction of the virtual vehicle in the environment provided in the application.

Operation S103. Control, in a case that an angle between a vehicle head direction and a traveling direction is greater than or equal to a first threshold after an operation end event corresponding to the target interaction control is received, the virtual vehicle to remain in the drift state.

In some embodiments, the terminal needs to monitor the angle between the vehicle head direction and the traveling direction of the virtual vehicle. Schematically, the monitoring includes, but is not limited to, at least one of the following four manners.

1. The angle between the vehicle head direction and the traveling direction of the virtual vehicle is monitored in real time in a case that the virtual vehicle is in the drift state.

2. After receiving the operation end event corresponding to the target interaction control, the terminal monitors the angle between the vehicle head direction and the traveling direction of the virtual vehicle in real time. The operation end event is triggered when the user operation on the target interaction control starts to disappear, for example, the operation end event is an event generated when a touch for a touch operation of simultaneously pressing the direction key and the drift control is canceled.

3. The terminal monitors the angle between the vehicle head direction and the traveling direction of the virtual vehicle at predetermined time intervals.

4. The terminal monitors the angle between the vehicle head direction and the traveling direction of the virtual vehicle upon receiving a direction control operation.

In a case that the angle between the vehicle head direction and the traveling direction is greater than or equal to the first threshold after the operation end event corresponding to the target interaction control is received, the terminal controls the virtual vehicle to remain in the drift state. "Remaining in the drift state" refers to a situation that, in a process in which the virtual vehicle is in the drift state, even if the user stops performing a drift trigger operation, provided that the angle between the vehicle head direction and the traveling direction remains to be greater than or equal to the first threshold, the terminal automatically controls the virtual vehicle to remain in the drift state (in other words, to continue the drift state and keep the drift state not being interrupted).

Figure 2:
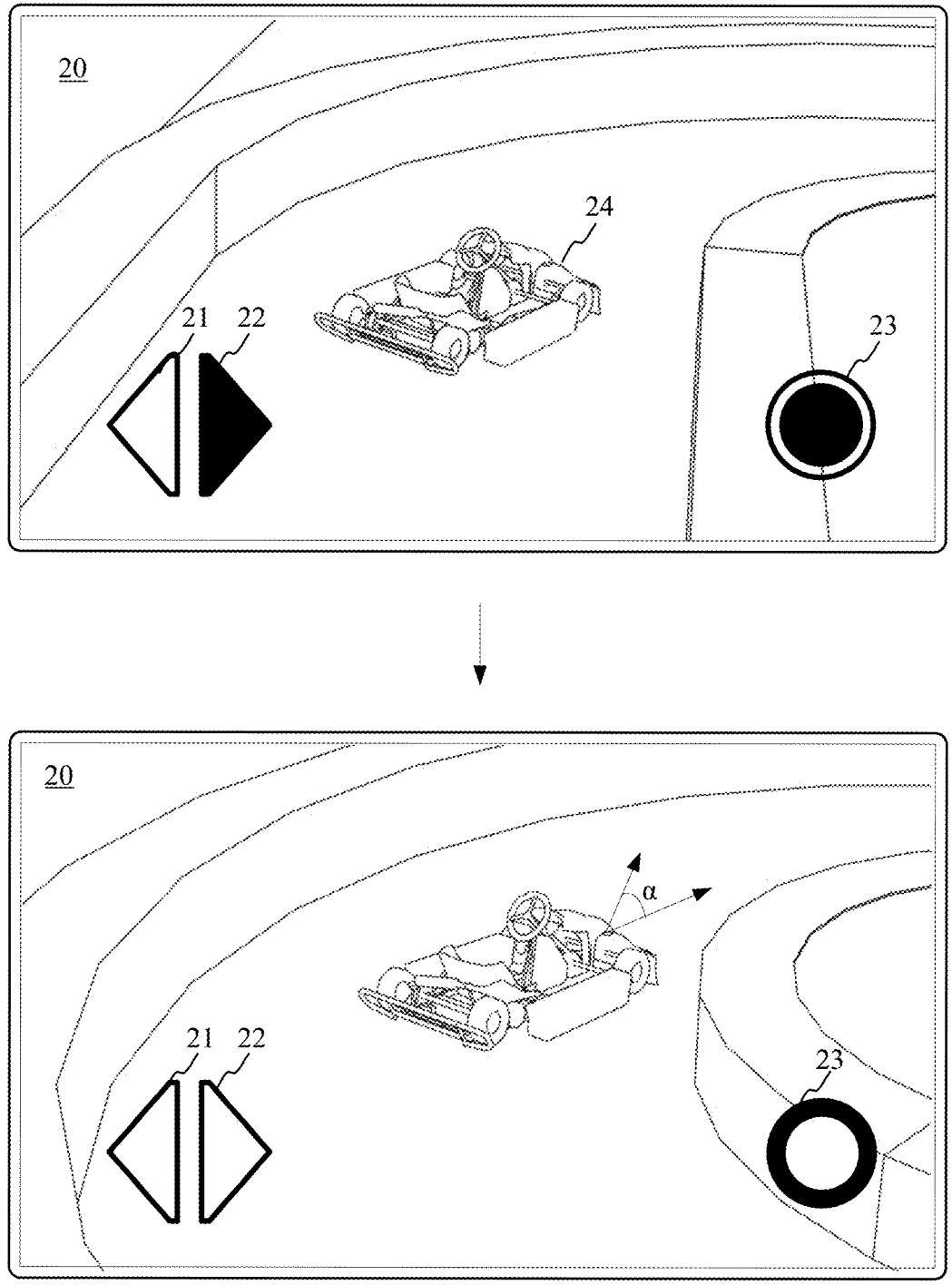
FIG. 2 is a schematic interface diagram of a drift method for a virtual vehicle in a virtual world according to an example embodiment of the disclosure.

As shown in FIG. 2, the terminal displays a user interface 20 of the automobile racing application. The user interface 20 includes a left direction key 21, a right direction key 22, a drift button 23, and a virtual vehicle 24. The left direction key 21 is a control used for controlling the virtual vehicle 24 to move to a left side. The right direction key 22 is a control used for controlling the virtual vehicle 24 to move to a right side. The drift button 23 is a control used for triggering the virtual vehicle 24 to enter a drift state.

When the virtual vehicle 24 is driving in a curve, the user simultaneously presses the right direction key 22 and the drift button 23 as a drift trigger operation (the black fill color in the figure represents that the control is pressed). After receiving the drift trigger operation, the terminal controls the virtual vehicle 24 to enter a drift state.

After the user cancels pressing the right direction key 22 and the drift button 23 (the white fill color in the figure represents that the control is not pressed), if the terminal detects that the drift trigger operation is over, and that an angle α between a vehicle head direction and a traveling direction of the virtual vehicle 24 is greater than or equal to a threshold, then the terminal controls the virtual vehicle 24 to remain in the drift state.

Thus, according to the method provided in this embodiment, after the operation end event corresponding to the target interaction control is received, in a case that the angle between the vehicle head direction and the traveling direction is greater than or equal to the first threshold, the virtual vehicle is controlled to remain in the drift state. In this way, in the process of controlling the virtual vehicle to remain in the drift state, the user may only control the angle between the vehicle head direction and the traveling direction and does not need to simultaneously press a direction key and a drift control. Therefore, the user may only need to press the direction key to control the vehicle head direction to remain in the drift state, thereby reducing the difficulty of operation, and improving the convenience of man-machine interactions in some scenarios that are not suitable for long-term operation performed by using hands.

Figure 3:
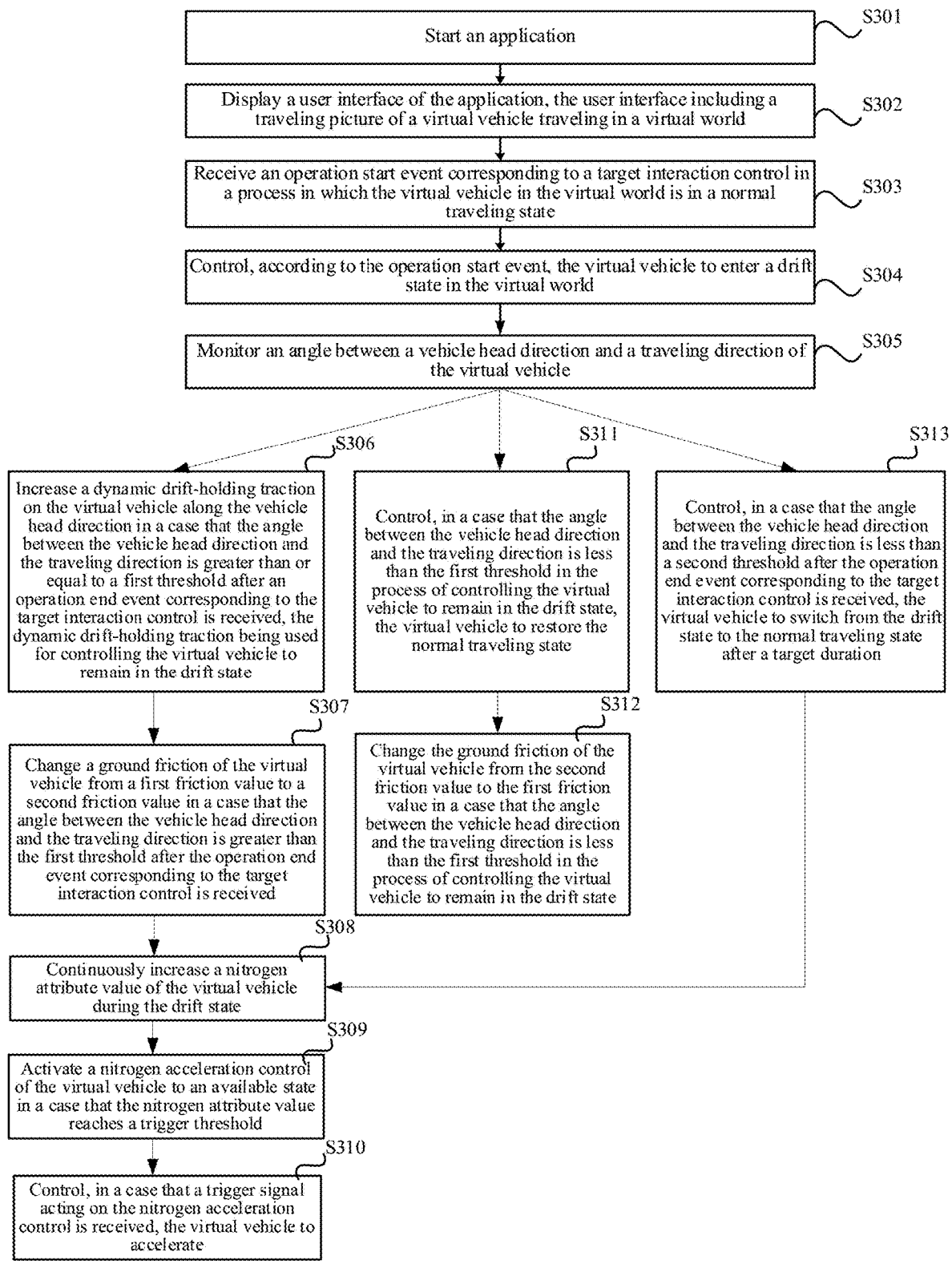
FIG. 3 is a flowchart of a drift method for a virtual vehicle in a virtual world according to another example embodiment of the disclosure.

FIG. 3 is a flowchart of a drift method for a virtual vehicle in a virtual world according to another example embodiment of the disclosure. This embodiment is described by using an example in which the method is applicable to a terminal running an application. The application is a program allowing a virtual vehicle to enter a drift state in a traveling process of the virtual vehicle. The application is configured to perform the method including the following operations S301-S310.

Operation S301. Start an application.

There are various applications installed on a terminal. Start icons of the applications may be displayed on a desktop of the terminal.

A user may click/tap a start icon of an application. The terminal starts the application after the start icon is triggered. The application is an application provided with a virtual environment and a virtual vehicle located in the virtual environment. The application further allows the virtual vehicle to enter a drift state during traveling.

Operation S302. Display a user interface of the application, the user interface including a traveling picture of a virtual vehicle traveling in a virtual world.

The terminal runs the application and displays a user interface of the application. The user interface includes a traveling picture of a virtual vehicle traveling in a virtual world. The traveling picture displays a picture in which the virtual environment is observed from a first perspective or a third perspective of the virtual vehicle. The first perspective is also referred to as a perspective of a driver or an interior perspective of a vehicle, and the third perspective is also referred to as a rear perspective of a vehicle or a far perspective.

For example, when the virtual world is a three-dimensional virtual world, the first perspective may be implemented by using a first camera disposed at a position of a driver, and the third perspective may be implemented by using a second camera disposed at the rear of the virtual vehicle. The first perspective and the third perspective move as the virtual vehicle moves. In this embodiment, the traveling picture is described by using an example from the third perspective, and this is not limited herein.

In some embodiments, various types of controls overlay the traveling picture on the user interface. The control includes at least a direction key and a drift control. The direction key is a control used for controlling a movement direction of the virtual vehicle. The direction key includes at least one of a front direction key, a left direction key, a back direction key, and a right direction key. The drift control is a control used for controlling the virtual vehicle to trigger and/or remain in a drift state. When the direction key (e.g., any one of the front direction key, the left direction key, the back direction key, and the right direction key) and the drift control are simultaneously pressed, the virtual vehicle is controlled to enter the drift state. When the direction key and the drift control are continuously pressed, the virtual vehicle remains in the drift state during the continuous pressing.

This embodiment is described by using an example in which the target interaction control includes the direction key and the drift control.

In some embodiments, the control further includes, for example, at least one of a ranking display control, a speed information control, a thumbnail map control, a brake control, a jet control, and a nitrogen acceleration control. The ranking display control is a control used for displaying a racing automobile ranking of the current virtual vehicle among all virtual vehicles. The speed information control is a control used for displaying at least one piece of time information in individual record time, single-round racing time, and total racing time of this round. The thumbnail map control is a control used for displaying an entire track map (and a real-time position at which the current virtual vehicle is located on the track map) from a top view by using a preset scaling. The brake control is a control used for controlling the virtual vehicle to decelerate. The jet control is a control used for controlling the virtual vehicle to explosively accelerate in a relatively short first time period. A duration of the first time period may be a fixed duration. The nitrogen acceleration control is a control used for controlling the virtual vehicle to explosively accelerate in a relatively long second time period. A duration of the second time period may be dynamically determined according to a nitrogen attribute value.

In some embodiments, the jet control and the nitrogen acceleration control are both rewarded prop controls, which may be triggered and used only after the virtual vehicle meets a preset condition during traveling and obtains rewarded props. Otherwise, the jet control and the nitrogen acceleration control are displayed in an deactivated state and cannot be used. Schematically, the nitrogen acceleration control is a prop control that only may be triggered and used when an available nitrogen value accumulates to a threshold.

Operation S303. Receive an operation start event corresponding to a target interaction control in a process in which the virtual vehicle in the virtual world is in a normal traveling state.

The user controls the virtual vehicle to travel in the environment provided in the virtual world. During traveling, the user may use the direction key to control the traveling direction of the virtual vehicle.

Figure 4:
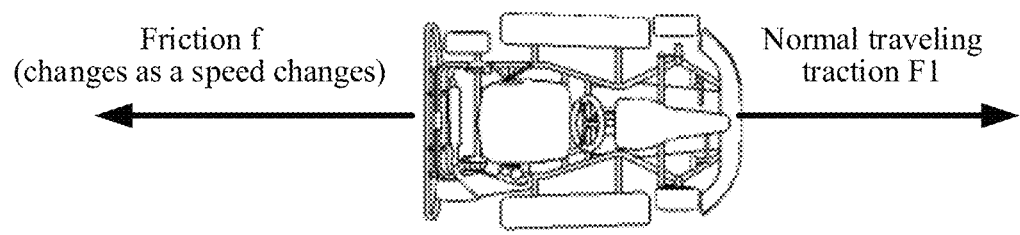
FIG. 4 is a force analysis diagram of a virtual vehicle traveling normally in a virtual world according to another example embodiment of the disclosure.

As shown in FIG. 4, when the virtual vehicle is traveling in the virtual world, the virtual vehicle is affected by a normal traveling traction F1 and a resistance f. The normal traveling traction F1 refers to a traction directed to the front of the vehicle head, and the resistance f includes at least one of a friction from the ground and a wind resistance. The normal traveling traction F1 is greater than or equal to the resistance f.

In a process in which the virtual vehicle travels in the normal traveling state, the user may further trigger a drift trigger operation on the target interaction control. In some embodiments, the drift trigger operation includes a trigger operation with respect to the drift control. Alternatively, the drift trigger operation includes a trigger operation with respect to the direction control and the drift control. Alternatively, the drift trigger operation includes a trigger operation with respect to a driving analog peripheral.

In some embodiments, the drift trigger operation may be an operation triggered through a touch display screen, or may be an operation triggered by controlling an external input device, for example, an operation triggered by controlling a mouse, a VR handle, a driving analog peripheral, or the like. The driving analog peripheral includes at least one of a steering wheel, a gear lever, an accelerator, and a brake.

In some embodiments, the drift trigger operation may be a tap operation, a combo operation, a long press operation, a slide operation, or the like. The type of the drift trigger operation is not limited in this embodiment.

For example, the drift trigger operation is an operation of simultaneously pressing the left direction key and the drift control, or an operation of simultaneously pressing the right direction key and the drift control.

By using an example in which the drift trigger operation is an operation of simultaneously pressing a direction key and a drift control displayed on a touch screen, when the foregoing touch screen detects a user touch, a touch start event is generated in an operating system of the terminal. The touch start event is the operation start event.

Schematically, a touch event in the operating system of the terminal is triggered when the user puts a finger on the screen, slides the finger on the screen, and/or removes the finger from the screen. There may be the following several types of touch events.

Touchstart event (touch start event): this event is triggered when a finger starts to touch the screen. Even if one finger has been put on the screen, the event may still be triggered when another finger touches the screen.

Touchmove event (touch move event): this event is continuously triggered when a finger slides on the touch screen. During the occurrence of this event, rolling may be prevented by invoking a preventDefault ( ) event.

Touchend event (touch end event): this event is triggered when a finger is removed from the touch screen.

An application in the terminal may determine the touch start event obtained at the foregoing program level as the operation start event corresponding to the target interaction control.

Operation S304. Control, according to the operation start event, the virtual vehicle to enter a drift state in the virtual world.

The drift state refers to a movement state in which a vehicle body slides through a turn in a case that a relatively large angle is generated between a vehicle head direction and a traveling direction. The vehicle head direction is directed to the front of the vehicle head of the virtual vehicle. The traveling direction is a direction in which the virtual vehicle moves in the virtual world.

Operation S305. Monitor an angle between a vehicle head direction and a traveling direction of the virtual vehicle.

In some embodiments, the terminal monitors the angle between the vehicle head direction and the traveling direction of the virtual vehicle, and the monitoring includes, but is not limited to, at least one of the following four manners.

1. The angle between the vehicle head direction and the traveling direction of the virtual vehicle is monitored in real time in a case that the virtual vehicle is in the drift state.

2. After receiving the operation end event corresponding to the target interaction control, the terminal monitors the angle between the vehicle head direction and the traveling direction of the virtual vehicle in real time. The operation end event is triggered when the user operation on the target interaction control starts to disappear, for example, the operation end event is an event generated when a touch for a touch operation of simultaneously pressing the direction key and the drift control is canceled.

3. The terminal monitors the angle between the vehicle head direction and the traveling direction of the virtual vehicle at predetermined time intervals.

4. The terminal monitors the angle between the vehicle head direction and the traveling direction of the virtual vehicle upon receiving a direction control operation.

In this embodiment, when the user stops touching the target interaction control (for example, the user lifts the finger from the direction key and the drift control), the operating system of the terminal generates the touchend event corresponding to the target interaction control, and the application in the terminal determines the touchend event as an operation end event. After the operation end event corresponding to the target interaction control is received, the terminal monitors the angle between the vehicle head direction and the traveling direction of the virtual vehicle.

In some embodiments, in the process of monitoring the angle, the terminal receives a direction control operation performed by the user, changes the vehicle head direction of the virtual vehicle according to the direction control operation, and determines an angle between the changed vehicle head direction and the traveling direction. The direction control operation may be an operation performed on the direction key, or may be an operation performed on a steering wheel.

For example, the direction control operation may be an operation of pressing the left direction key or an operation of pressing the right direction key.

After determining the angle between the vehicle head direction and the traveling direction of the virtual vehicle, the terminal further determines a magnitude relationship between the angle and a first threshold and a magnitude relationship between the angle and a second threshold, the first threshold being greater than the second threshold. Schematically, the first threshold is 45 degrees, and the second threshold is 10 degrees.

When the angle is greater than or equal to the first threshold, operation S306 is performed. When the angle is less than the first threshold and is greater than or equal to the second threshold, operation S313 is performed. When the angle is less than the second threshold, operation S311 is performed.

After the drift trigger operation is over, the vehicle head direction or the traveling direction of the virtual vehicle is affected by a plurality of factors such as a traction direction, the direction control operation, and a resistance and thus is changed. Further, because the user may perform a plurality of times of direction control operations, this operation may be correspondingly performed for a plurality of times.

Operation S306. Increase a dynamic drift-holding traction on the virtual vehicle along the vehicle head direction in a case that the angle between the vehicle head direction and the traveling direction is greater than or equal to the first threshold after an operation end event corresponding to the target interaction control is received, the dynamic drift-holding traction being used for controlling the virtual vehicle to remain in the drift state.

After the drift trigger operation triggered by the user on the target interaction control is over, if the terminal determines that the angle between the vehicle head direction and the traveling direction of the virtual vehicle is greater than the first threshold, the terminal increases a dynamic drift-holding traction on the virtual vehicle along the vehicle head direction, the dynamic drift-holding traction being used for controlling the virtual vehicle to remain in the drift state.

In some embodiments, the "remaining in the drift state" may be referred to as a drift-holding state.

Figure 5:
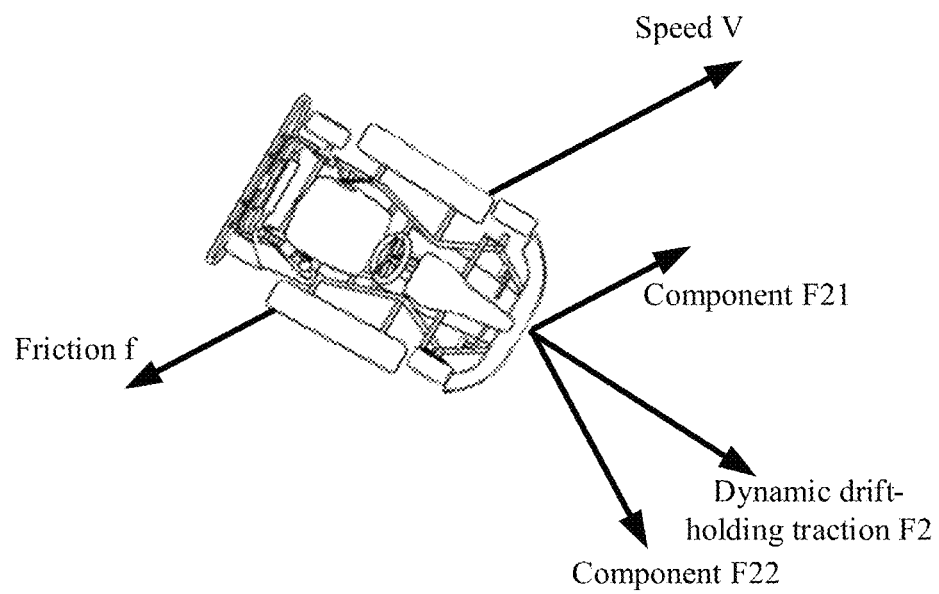
FIG. 5 is a force analysis diagram of a virtual vehicle traveling in a drift-holding state in a virtual world according to another example embodiment of the disclosure.

As shown in FIG. 5, a direction of a dynamic drift-holding traction F2 of the virtual vehicle is directed to the front of the vehicle head. The virtual vehicle in the drift state moves according to a speed V along the traveling direction. The virtual vehicle is also affected by a friction f reverse to the speed V. A component F21 of the dynamic drift-holding traction F2 in the traveling direction is greater than or equal to the friction f, so that the virtual vehicle remains in the drift state. In this case, another traction component F22 of the dynamic drift-holding traction F2 changes the vehicle head direction, and the direction control operation performed by the user is needed to control the vehicle head direction of the virtual vehicle. Optionally, in a normal traveling state, the friction f is in a positive correlation with a speed of the virtual vehicle.

In some embodiments, an additional returnability is further added in the application. The returnability is used for guiding, in a case that no control signal exists, the virtual vehicle to automatically return to a vehicle head direction coinciding with the traveling direction during the drift.

In some embodiments, a traction component of the dynamic drift-holding traction in the traveling direction is greater than or equal to a resistance.

In some embodiments, a magnitude of the dynamic drift-holding traction is in a positive correlation with the speed of the virtual vehicle. Alternatively, in a preset speed range, a magnitude of the dynamic drift-holding traction is in a positive correlation with the speed of the virtual vehicle. After the preset speed range is exceeded, the magnitude of the dynamic drift-holding traction may remain unchanged.

In a possible implementation, the resistance received by the virtual vehicle is a ground friction. The ground friction is in a positive correlation with the speed of the virtual vehicle in the preset speed range, and a direction of the ground friction is reverse to the traveling direction. A friction component of the dynamic drift-holding traction received by the virtual vehicle in the traveling direction remains the same as the ground friction. Alternatively, the friction component is slightly greater than the ground friction but the friction component has a magnitude such that the virtual vehicle remains in the drift state.

Operation S307. Change a ground friction of the virtual vehicle from a first friction value to a second friction value in a case that the angle between the vehicle head direction and the traveling direction is greater than the first threshold after the operation end event corresponding to the target interaction control is received, the first friction value being greater than the second friction value.

In some embodiments, the first friction value is determined according to the speed of the virtual vehicle in real time. In a preset speed range, the speed of the virtual vehicle is in a positive correlation with the ground friction.

In some embodiments, the second friction value is a relatively small preset empirical value. When the application reduces the ground friction of the virtual vehicle in the process of holding the virtual vehicle in the drift state, the decay of the speed of the virtual vehicle caused by the ground friction may be reduced, so that the virtual vehicle is easier to remain in the drift state.

When there are a plurality of virtual vehicles in the virtual world, ground frictions of the virtual vehicles may be set independently of each other, depending on a current speed and a traveling state of the virtual vehicle.

Operation S308. Continuously increase a nitrogen attribute value of the virtual vehicle during the drift state.

In the process in which the virtual vehicle enters the drift state, the application continuously increases a nitrogen attribute value of a nitrogen acceleration control according to a duration of the drift state. The duration is in a positive correlation with the accumulated nitrogen attribute value. Herein, nitrogen and nitrogen attribute value are described as examples of an element used for accelerating the virtual vehicle in the application, but the disclosure is not limited thereto and includes any other elements that may indicate being usable for accelerating the virtual vehicle in the application and may be displayed in the user interface to be triggered by the user to accelerate the virtual vehicle.

Operation S309. Activate a nitrogen acceleration control of the virtual vehicle to an available state in a case that the nitrogen attribute value reaches a trigger threshold.

The nitrogen acceleration control corresponds to a trigger threshold. In a case that the nitrogen attribute value does not accumulate to the trigger threshold, the nitrogen acceleration control is in an unavailable state. An available state (or a deactivated state) is a state in which the nitrogen acceleration control is displayed on the user interface but cannot be triggered or a state not displayed on the user interface. In a case that the nitrogen attribute value accumulates to the trigger threshold, the nitrogen acceleration control is activated to an available state. The available state is a state in which the nitrogen acceleration control is displayed on the user interface and that may be triggered.

Operation S310. Control, in a case that a trigger signal with respect to the nitrogen acceleration control is received, the virtual vehicle to accelerate.

In some embodiments, the nitrogen acceleration control is a control displayed on the touch display screen. When the nitrogen acceleration control is in the available state, if the user presses the nitrogen acceleration control, the terminal receives a trigger signal with respect to the nitrogen acceleration control, and controls, according to the trigger signal, the virtual vehicle to accelerate.

The terminal may control, according to remaining available nitrogen in the nitrogen attribute value, the virtual vehicle to accelerate, that is, the acceleration process needs to constantly consume the nitrogen in the nitrogen attribute value. When the nitrogen in the nitrogen attribute value runs out, the terminal controls the virtual vehicle to exit from the acceleration state.

In some embodiments, if the virtual vehicle collides with another object in the acceleration process, the terminal also controls the virtual vehicle to exit from the acceleration state.

Operation S311. Control, in a case that the angle between the vehicle head direction and the traveling direction is less than the first threshold in the process of controlling the virtual vehicle to remain in the drift state, the virtual vehicle to restore the normal traveling state.

The terminal may switch a traction from the dynamic drift-holding traction to a normal traveling traction, the normal traveling traction being used for controlling the virtual vehicle to enter the normal traveling state.

Operation S312. Change the ground friction of the virtual vehicle from the second friction value to the first friction value in a case that the angle between the vehicle head direction and the traveling direction is less than the first threshold in the process of controlling the virtual vehicle to remain in the drift state.

In this case, the application further changes the ground friction of the virtual vehicle from the second friction value to the first friction value.

In some embodiments, the first friction value is determined according to the speed of the virtual vehicle in real time. In a preset speed range, the speed of the virtual vehicle is in a positive correlation with the ground friction.

In some embodiments, the second friction value is a relatively small preset empirical value.

Operation S313. Control, in a case that the angle between the vehicle head direction and the traveling direction is less than a second threshold after the operation end event corresponding to the target interaction control is received, the virtual vehicle to switch from the drift state to the normal traveling state after a target duration.

After the operation end event corresponding to the target interaction control is received, in a case that the angle between the vehicle head direction and the traveling direction is relatively small (for example, less than 10 degrees), the virtual vehicle enters another short drift state. The "short drift state" may be referred to as a point-drift state. The point-drift state is a state different from the drift-holding state. The application controls the virtual vehicle to switch from the drift state to the normal traveling state after a short target duration.

In some embodiments, the application calculates, according to the speed of the virtual vehicle and the ground friction, a decay duration during which the virtual vehicle decays from the drift state to the normal traveling state, controls, in a case that the decay duration is greater than a shortest drift duration, the virtual vehicle to decay from the drift state to the normal traveling state according to the decay duration, and controls, in a case that the decay duration is less than the shortest drift duration, the virtual vehicle to decay from the drift state to the normal traveling state according to the shortest drift duration.

In some embodiments, after the operation end event corresponding to the target interaction control is received, in a case that the angle between the vehicle head direction and the traveling direction is less than the second threshold, the application further changes the ground friction of the virtual vehicle from the second friction value to the first friction value, so that the virtual vehicle switches from the point-drift state to the normal traveling state.

In addition, the point-drift state is also a drift state. Therefore, the application further performs operation S308, that is, continuously increases a nitrogen attribute value of the virtual vehicle during the drift state (point-drift state). The point-drift state may help the user to quickly accumulate a few nitrogen attribute values. When the nitrogen attribute value accumulated in a drift-holding manner or an ordinary drift manner is to reach the trigger threshold, the user may accumulate the remaining nitrogen value by using the point-drift state.

Thus, according to the method provided in this embodiment, after the operation end event corresponding to the target interaction control is received, in a case that the angle between the vehicle head direction and the traveling direction is greater than the first threshold, the virtual vehicle is controlled to remain in the drift state. In this way, in the process of controlling the virtual vehicle to remain in the drift state, the user may only control the angle between the vehicle head direction and the traveling direction and does not need to simultaneously press a direction key and a drift control. Therefore, the user may only need to press the direction key to control the vehicle head direction, thereby reducing the difficulty of operation to remain in the drift state, and improving the convenience of man-machine interactions in some scenarios that are not suitable for long-term operation performed by using hands.

According to the method provided in this embodiment, after the operation end event corresponding to the target interaction control is received, at each time the direction control operation of the user is received, it is further determined whether the angle between the vehicle head direction and the traveling direction of the virtual vehicle is greater than a threshold. In a case that the angle between the vehicle head direction and the traveling direction of the virtual vehicle is greater than the first threshold, the virtual vehicle remains in the drift state, and the nitrogen attribute value of the nitrogen acceleration control is accumulated according to the duration in which the virtual vehicle is in the drift state (drift holding). In a relatively concise man-machine interaction manner, the user may quickly accumulate an available nitrogen value, to obtain more nitrogen acceleration controls of a rewarding property.

According to the method provided in this embodiment, after the operation end event corresponding to the target interaction control is received, in a case that the angle between the vehicle head direction and the traveling direction of the virtual vehicle is less than the second threshold, the virtual vehicle enters in the point-drift state, and the nitrogen attribute value of the nitrogen acceleration control is accumulated according to the duration in which the virtual vehicle is in the drift state (point drift). In a short man-machine interaction manner, the user may quickly accumulate a few available nitrogen values, and do not need to greatly change the traveling direction of the virtual vehicle, so that when the nitrogen attribute value accumulated in the drift-holding state or the ordinary drift state is to reach the threshold, the user may obtain the nitrogen acceleration control of a rewarding property more quickly by using the point-drift state.

Figure 6:
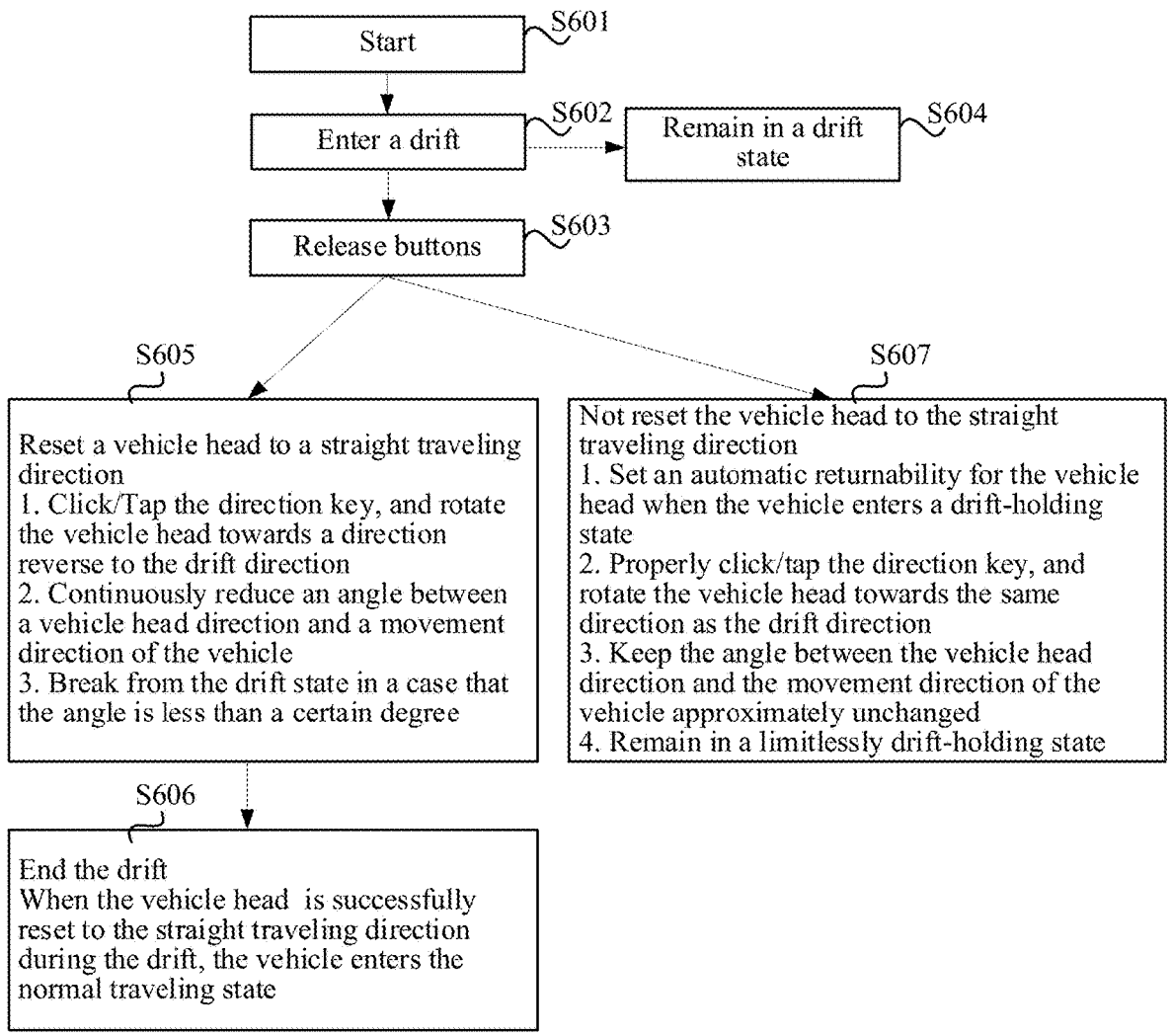
FIG. 6 is a flowchart of a drift method for a virtual vehicle in a virtual world according to another example embodiment of the disclosure.

FIG. 6 is a flowchart of a drift method for a virtual vehicle in a virtual world according to another example embodiment of the disclosure. In an example, the drift method in this embodiment include operations S601-S607

S601. The user opens the application and starts an automobile racing game.

S602. The user controls a vehicle to enter a drift by pressing buttons (e.g., the direction key and the drift key), and operation S604 is performed.

S604. When the virtual vehicle enters a drift, the application controls the racing automobile to remain in a drift state, and remaining in a drift state may be referred to as drift holding.

S603. The user releases the buttons (e.g., the direction key and the drift key) and cancels the drift trigger operation.

S605. If the user chooses to reset the vehicle head to a straight traveling direction, the user may trigger one or more of the following operations:

clicking/tapping the direction key, and rotating the vehicle head towards a direction away from to the drift direction (or toward the traveling direction);

continuously reducing an angle between the vehicle head direction and a movement direction of the vehicle; and breaking from the drift state in a case that the angle is less than a certain degree.

S606. The application controls the racing automobile to end the drift, and when the vehicle head is successfully reset to the straight traveling direction during the drift, the vehicle enters the normal traveling state.

S607. If the user chooses not to reset the vehicle head to the straight traveling direction, the user may trigger one or more of the following operations:

setting an automatic returnability for the vehicle head when the vehicle enters a drift-holding state;

properly clicking/tapping the direction key, and rotating the vehicle head towards the same direction as the drift direction;

keeping the angle between the vehicle head direction and the movement direction of the vehicle approximately unchanged; and remaining in a limitlessly drift-holding state.

The returnability is used for guiding, in a case that no control signal exists, the virtual vehicle to automatically return to a vehicle head direction coinciding with the traveling direction during the drift.

Figure 7:
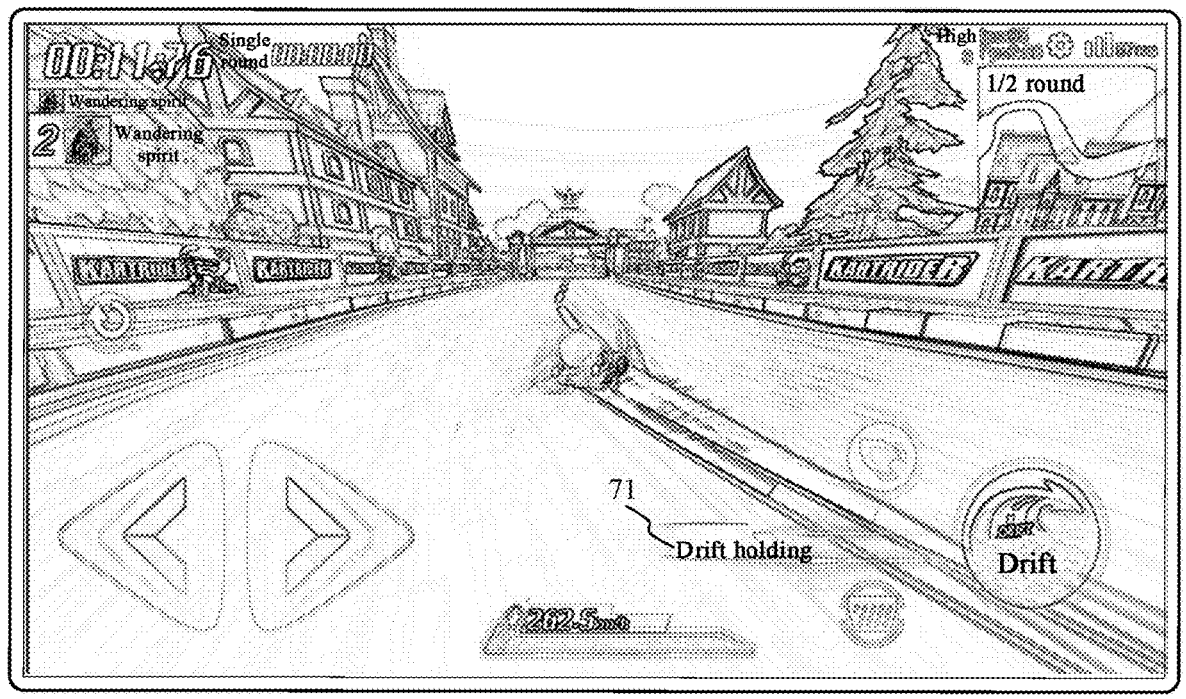
FIG. 7 is a schematic interface diagram of a drift method for a virtual vehicle in a virtual world according to an example embodiment of the disclosure.
Figure 8:
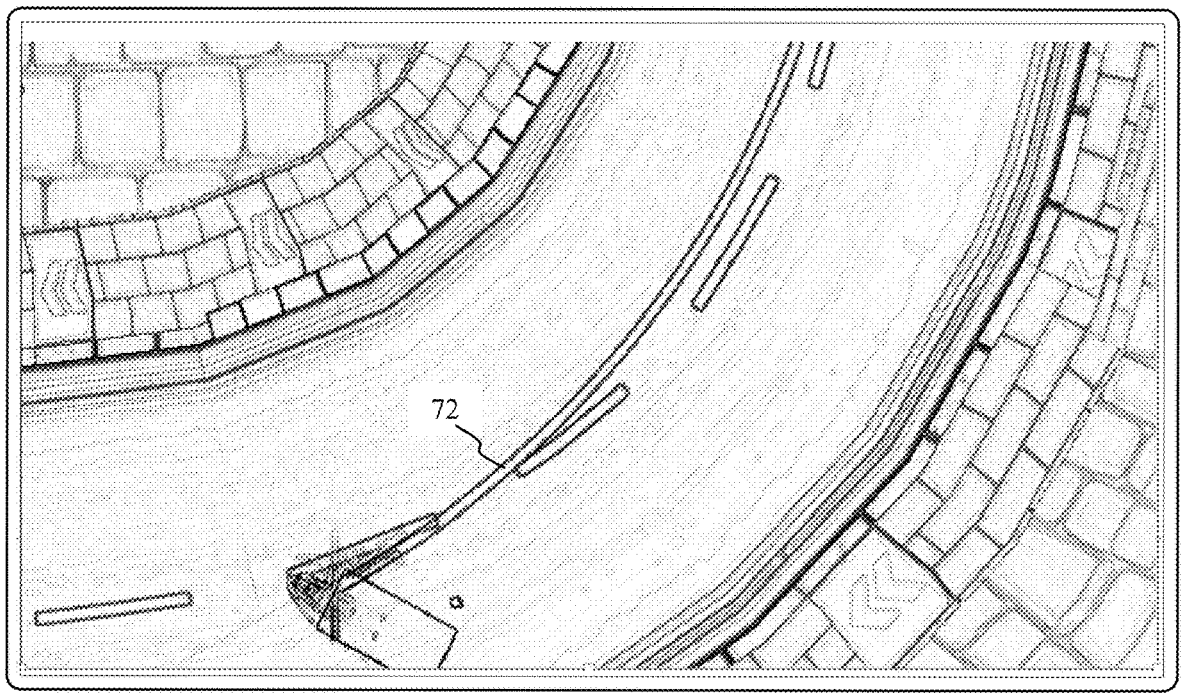
FIG. 8 is a schematic interface diagram of a drift method for a virtual vehicle in a virtual world according to an example embodiment of the disclosure.

FIGS. 7 and 8 are schematic interface diagrams of a drift method for a virtual vehicle in a virtual world according to an example embodiment of the disclosure.

In some embodiments, as shown in FIG. 7, during the drift holding, the user interface may further be overlaid with and display a first character "drift holding" 71. According to another aspect, as shown in FIG. 8, during the drift holding, a tire trace 72 of the virtual vehicle on the track caused by the drift holding is shown longer.

Referring to FIG. 5, during the continuous drift of the racing automobile in this embodiment of the disclosure, in addition to an inertial speed V, there is also a relatively large 'drift-holding' power F2. The power and the friction f act jointly. In this case, an F/f power calculation changes dynamically, which results in a similar effect that the racing automobile is performing a uniform circular motion (a motion of a dynamic arc in the actual implementation). Theoretically, the "drift-holding" state of the racing automobile may be maintained indefinitely.

Figure 9:
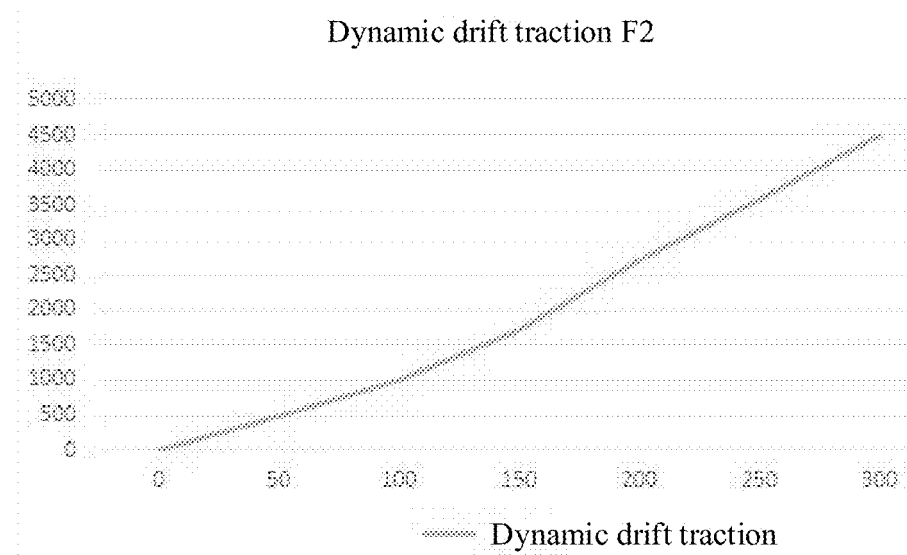
FIG. 9 is a graph illustrating an example of a correspondence between a dynamic drift traction and a friction according to an example embodiment of the disclosure.

Schematically, FIG. 9 shows a calculation method of the dynamic drift traction F2 and the friction f according to an example embodiment of the disclosure. The dynamic drift traction F2 changes as a real-time speed of the racing automobile changes. A higher speed of the racing automobile indicates a larger dynamic drift traction F2. After the speed of the racing automobile reaches a certain degree, the dynamic drift traction F2 stops increasing. The traction f also changes as the real-time speed of the racing automobile changes, and a magnitude of the friction f is in direct proportion to the square of the real-time speed of the racing automobile.

During the drift holding, the user needs to control the vehicle head direction of the virtual racing automobile in real time, for example, control the angle between the vehicle head direction and the traveling direction to a range from 35 degrees to 45 degrees. A reason that the user needs to control the vehicle head direction is because the user needs to control the angle between the vehicle head direction and the traveling direction in real time not to be too small, otherwise the racing automobile exits the drift state. An operation basis of the drift holding is that the user controls the angle between the vehicle head direction and the traveling direction such that a joint force received by the racing automobile is maintained similar to a centripetal force, and the racing automobile performs a motion similar to a circular motion. In an actual implementation, the route of the racing automobile may not be a standard arc, but a non-standard arc that changes in real time. In this manner, the user may have better game experience using a track design. Different track arcs require players to control different drift angles.

In some embodiments, when the drift holding needs to end, the player needs to control the vehicle head to rotate so that the angle between the vehicle head direction and the traveling direction is 0 degrees (or a substantially small degree). In this way, the racing automobile is in the normal traveling state, and the dynamic drift traction F2 in FIG. 5 is switched to the normal traveling traction F1 in FIG. 4. F1 is a constant value, and the friction f still increases as the speed increases. A balance is finally achieved between the normal traveling traction f and the friction F1, and the racing automobile may perform a uniform linear motion in a line, which conforms to a power design principle of vehicles in the real world.

Figure 10:
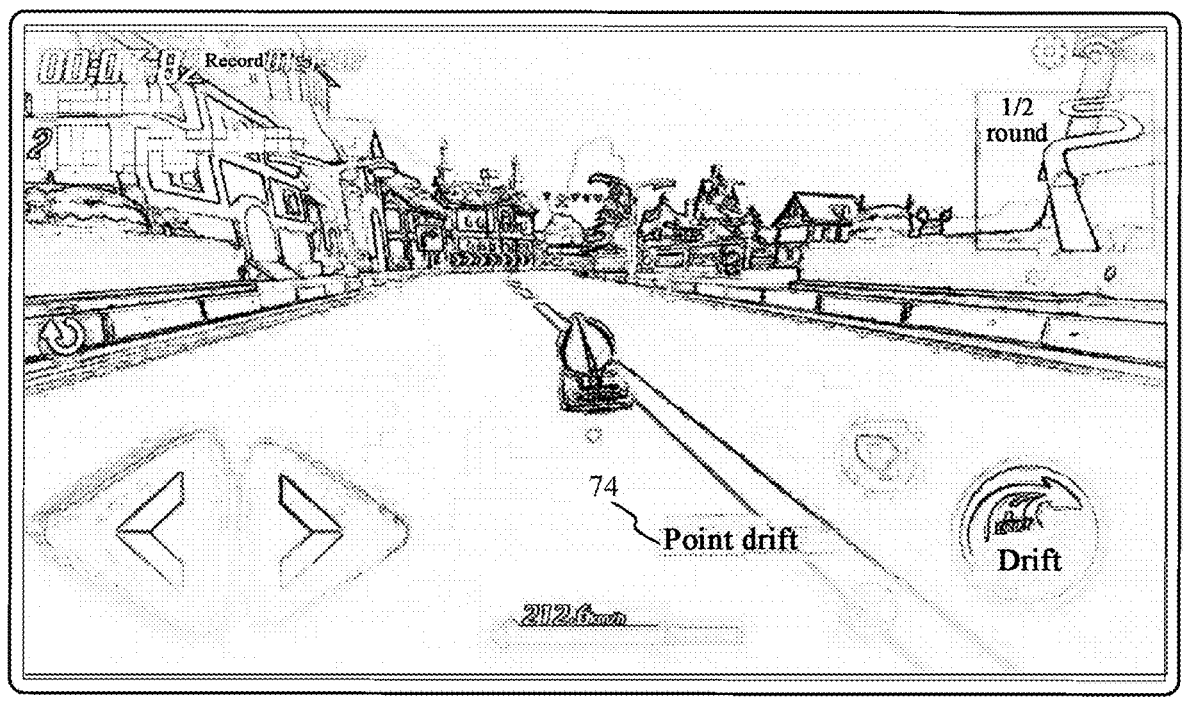
FIG. 10 is a schematic interface diagram of a drift method for a virtual vehicle in a virtual world according to an example embodiment of the disclosure.

In an optional embodiment, after operation S603, if the user releases the buttons, and the angle between the vehicle head direction and the traveling direction of the virtual vehicle is within 10 degrees, the virtual vehicle does not enter the drift-holding state, but enters another short drift state referred to as the point-drift state. After maintaining the short drift state, the racing automobile switches from the drift state to the normal traveling state. In some embodiments, as shown in FIG. 10, during the point drift, the user interface may further be overlaid with and display a second character "point drift" 74.

Apparatus embodiments of the disclosure are described below, where the apparatus embodiments correspond to the foregoing method embodiments. Repetitive descriptions are avoided and for a part that is not described in detail in the apparatus embodiments, the corresponding descriptions in the foregoing method embodiments may be referred to.

Figure 11:
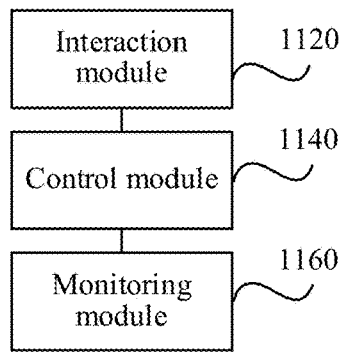
FIG. 11 is a schematic diagram of a drift apparatus for a virtual vehicle in a virtual world according to an example embodiment of the disclosure.

FIG. 11 is a schematic structural block diagram of a drift apparatus for a virtual vehicle in a virtual world according to an example embodiment of the disclosure. The apparatus may be implemented as the entire or a part of a terminal by using software, hardware, or a combination thereof. The apparatus includes:

an interaction module 1120, configured to receive an operation start event corresponding to a target interaction control in a process in which a virtual vehicle in the virtual world is in a normal traveling state, the target interaction control being a control or a set of controls configured to trigger a drift state of the virtual vehicle; and a control module 1140, configured to control, according to the operation start event, the virtual vehicle to enter the drift state in the virtual world.

The control module 1140 is configured to control, in a case that an angle between a vehicle head direction and a traveling direction is greater than a first threshold after an operation end event corresponding to the target interaction control is received, the virtual vehicle to remain in the drift state.

In an optional embodiment, the control module 1140 is configured to increase a dynamic drift-holding traction on the virtual vehicle along the vehicle head direction, the dynamic drift-holding traction being used for controlling the virtual vehicle to remain in the drift state.

In an optional embodiment, a magnitude of the dynamic drift-holding traction is in a positive correlation with a speed of the virtual vehicle in a preset speed range.

In an optional embodiment, the control module 1140 is further configured to change a ground friction of the virtual vehicle from a first friction value to a second friction value in a case that the angle between the vehicle head direction and the traveling direction is greater than the first threshold after the operation end event corresponding to the target interaction control is received, the first friction value being greater than the second friction value.

In an optional embodiment, the control module 1140 is further configured to continuously increase a nitrogen attribute value of the virtual vehicle during the drift state, activate a nitrogen acceleration control of the virtual vehicle to an available state in a case that the nitrogen attribute value reaches a trigger threshold, and control, in a case that a trigger signal with respect to the nitrogen acceleration control is received, the virtual vehicle to perform an acceleration operation.

In an optional embodiment, the control module 1140 is further configured to control, in a case that the angle between the vehicle head direction and the traveling direction is less than the first threshold in the process of controlling the virtual vehicle to remain in the drift state, the virtual vehicle to restore the normal traveling state.

In an optional embodiment, the control module 1140 is further configured to change the ground friction of the virtual vehicle from the second friction value to the first friction value in a case that it is detected that the angle between the vehicle head direction and the traveling direction is less than the first threshold in the process of controlling the virtual vehicle to remain in the drift state, the first friction value being greater than the second friction value.

In an optional embodiment, the control module 1140 is further configured to switch the dynamic drift-holding traction to a normal traveling traction, the normal traveling traction being used for controlling the virtual vehicle to enter the normal traveling state, and the dynamic drift-holding traction being greater than the normal traveling traction.

In an optional embodiment, the apparatus further includes a monitoring module 1160.

The interaction module 1120 is further configured to receive a direction control operation.

The control module 1140 is further configured to change the vehicle head direction of the virtual vehicle according to the direction control operation.

The monitoring module 1160 is further configured to determine an angle between the changed vehicle head direction and the traveling direction.

In an optional embodiment, the control module 1140 is configured to control, in a case that the angle between the vehicle head direction and the traveling direction is less than a second threshold after the operation end event corresponding to the target interaction control is received, the virtual vehicle to switch from the drift state to the normal traveling state after a target duration, the second threshold being less than the first threshold.

In an optional embodiment, the control module 1140 is configured to calculate, according to the speed of the virtual vehicle and the ground friction, a decay duration during which the virtual vehicle decays from the drift state to the normal traveling state; control, in a case that the decay duration is greater than a shortest drift duration, the virtual vehicle to decay from the drift state to the normal traveling state according to the decay duration; and control, in a case that the decay duration is less than the shortest drift duration, the virtual vehicle to decay from the drift state to the normal traveling state according to the shortest drift duration.

Thus, according to the apparatus provided in this embodiment, after the operation end event corresponding to the target interaction control is received, in a case that the angle between the vehicle head direction and the traveling direction is greater than the first threshold, the virtual vehicle is controlled to remain in the drift state. In this way, in the process of controlling the virtual vehicle to remain in the drift state, the user may only control the angle between the vehicle head direction and the traveling direction and does not need to simultaneously press a direction key and a drift control. Therefore, the user may only need to press the direction key to control the vehicle head direction to remain in the drift state, thereby reducing the difficulty of operation, and improving the convenience of man-machine interactions in some scenarios that are not suitable for long-term operation performed by using hands.

Figure 12:
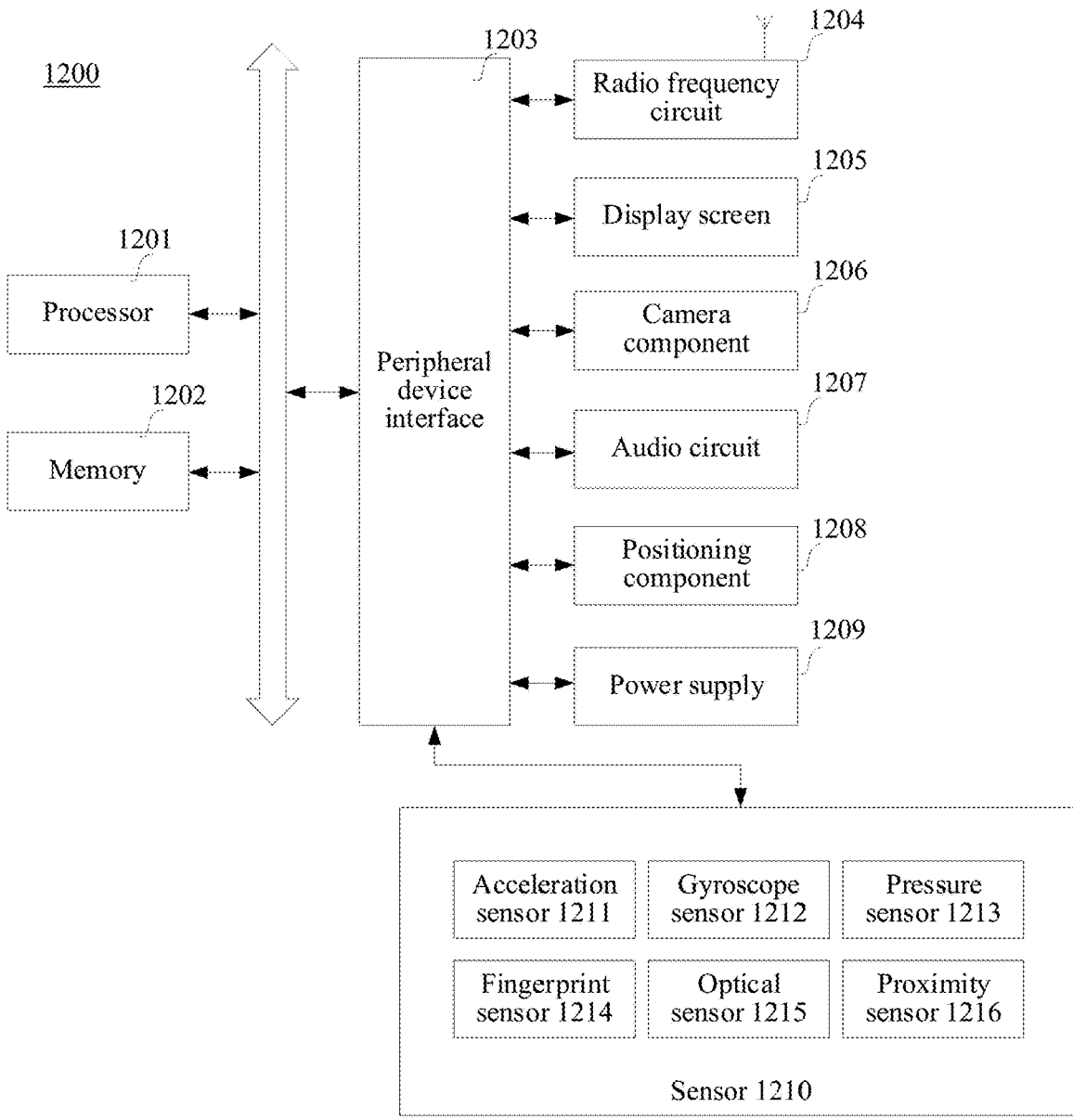
FIG. 12 is a schematic structural diagram of a computer device according to an embodiment of the disclosure.

FIG. 12 is a structural block diagram of a terminal 1200 according to an example embodiment of the disclosure. The terminal 1200 may be a smartphone, a tablet computer, a moving picture experts group audio layer III (MP3) player, a moving picture experts group audio layer IV (MP4) player, a notebook computer, or a desktop computer. The terminal 1200 may also be referred to as other names such as user equipment, a portable terminal, a laptop terminal, or a desktop terminal.

Generally, the terminal 1200 includes a processor 1201 and a memory 1202.

The processor 1201 may include one or more processing cores, and may be, for example, a 4-core processor or an 8-core processor. The processor 1201 may be implemented in at least one hardware form of a digital signal processor (DSP), a field-programmable gate array (FPGA), and a programmable logic array (PLA). The processor 1201 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1201 may be integrated with a graphics processing unit (GPU). The GPU is responsible for rendering and drawing content to be displayed by a display screen. In some embodiments, the processor 1201 may further include an artificial intelligence (AI) processor. The AI processor is configured to process a calculation operation related to machine learning.

The memory 1202 may include one or more computer-readable storage media. The computer-readable storage medium may be non-transient. The memory 1202 may further include a high-speed random access memory, and a non-volatile memory such as one or more magnetic disk storage devices and a flash storage device. In some embodiments, the non-transitory computer-readable storage medium in the memory 1202 is configured to store at least one instruction, the at least one instruction being configured to be executed by the processor 1201 to implement the drift method for a virtual vehicle in a virtual world provided in the method embodiments of the disclosure.

In some embodiments, the terminal 1200 may alternatively include: a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Specifically, the peripheral device includes: at least one of a radio frequency circuit 1204, a touch display screen 1205, a camera component 1206, an audio circuit 1207, a positioning component 1208, and a power supply 1209.

The peripheral device interface 1203 may be configured to connect the at least one peripheral device related to input/output (I/O) to the processor 1201 and the memory 1202. In some embodiments, the processor 1201, the memory 1202, and the peripheral device interface 1203 are integrated on a same chip or circuit board. In some other embodiments, any one or two of the processor 1201, the memory 1202, and the peripheral device interface 1203 may be implemented on a separate chip or the circuit board. This is not limited in this embodiment.

The radio frequency circuit 1204 is configured to receive and transmit a radio frequency (RF) signal, also referred to as an electromagnetic signal. The RF circuit 1204 communicates with a communication network and another communication device by using the electromagnetic signal. The RF circuit 1204 converts an electric signal into an electromagnetic signal for transmission, or converts a received electromagnetic signal into an electric signal. In some embodiments, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other terminals through at least one wireless communication protocol. The wireless communication protocol includes, but is not limited to, a metropolitan area network, generations of mobile communication networks (2G, 3G, 4G, and 5G), a wireless local area network, and/or a wireless fidelity (WiFi) network. In some embodiments, the RF circuit 1204 may also include a circuit related to near field communication (NFC). This is not limited in the disclosure.

The display screen 1205 is configured to display a user interface (UI). The UI may include a graphic, text, an icon, a video, and any combination thereof. When the display screen 1205 is the touch display screen, the display screen 1205 also has the capability to collect a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In some embodiments, there may be one display screen 1205, disposed on a front panel of the terminal 1200. In some other embodiments, there may be two display screens 1205, respectively disposed on different surfaces of the terminal 1200 or designed in a foldable shape. In still some other embodiments, the display screen 1205 may be a flexible display screen, disposed on a curved surface or a folded surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to collect an image or a video. In some embodiments, the camera component 1206 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera component 1206 may further include a flash. The flash may be a single color temperature flash or a double color temperature flash. The double color temperature flash refers to a combination of a warm flash and a cold flash, and may be configured to perform light ray compensation at different color temperatures.

The audio circuit 1207 may include a microphone and a loudspeaker. The microphone is configured to collect sound waves of a user and an environment, and convert the sound waves into electrical signals and input the electrical signals into the processor 1201 for processing, or input the electrical signals into the RF circuit 1204 to implement speech communication. For stereo collection or noise reduction, there may be a plurality of microphones, disposed at different portions of the terminal 1200 respectively. The microphone may alternatively be a microphone array or an omnidirectional collection microphone. The loudspeaker is configured to convert electrical signals from the processor 1201 or the RF circuit 1204 into sound waves. The loudspeaker may be a conventional thin-film loudspeaker or a piezoelectric ceramic loudspeaker. When the loudspeaker is the piezoelectric ceramic loudspeaker, electrical signals not only may be converted into sound waves that may be heard by human, but also may be converted into sound waves that cannot be heard by human for ranging and the like. In some embodiments, the audio circuit 1207 may further include an earphone jack.

The positioning component 1208 is configured to position a current geographic location of the terminal 1200 for implementing navigation or a location-based service (LBS). The positioning component 1208 may be a positioning component based on the global positioning system (GPS) of the United States, the COMPASS System of China, the GLONASS System of Russia, or the GALILEO System of the European Union.

The power supply 1209 is configured to supply power to components in the terminal 1200. The power supply 1209 may be an alternating current, a direct current, a primary battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In some embodiments, the terminal 1200 may also include one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established with the terminal 1200. For example, the acceleration sensor 1211 may be configured to detect a component of gravity acceleration on the three coordinate axes. The processor 1201 may control, according to a gravity acceleration signal collected by the acceleration sensor 1211, the touch display screen 1205 to display the user interface in a frame view or a portrait view. The acceleration sensor 1211 may be further configured to collect motion data of a game or a user.

The gyroscope sensor 1212 may detect a body direction and a rotation angle of the terminal 1200. The gyroscope sensor 1212 may cooperate with the acceleration sensor 1211 to collect a 3D action by the user on the terminal 1200. The processor 1201 may implement the following functions according to data collected by the gyroscope sensor 1212: motion sensing (for example, the UI is changed according to a tilt operation of the user), image stabilization during shooting, game control, and inertial navigation.

The pressure sensor 1213 may be disposed on a side frame of the terminal 1200 and/or a lower layer of the touch display screen 1205. When the pressure sensor 1213 is disposed on the side frame of the terminal 1200, a holding signal of the user on the terminal 1200 may be detected. The processor 1201 performs left and right hand recognition or a quick operation according to the holding signal collected by the pressure sensor 1213. When the pressure sensor 1213 is disposed on the low layer of the touch display screen 1205, the processor 1201 controls, according to a pressure operation of the user on the touch display screen 1205, an operable control on the UI. The operable control includes at least one of a button control, a scroll bar control, an icon control, and a menu control.

The fingerprint sensor 1214 is configured to collect a fingerprint of the user. The processor 1201 identifies an identity of the user according to the fingerprint collected by the fingerprint sensor 1214, or the fingerprint sensor 1214 identifies an identity of the user according to the collected fingerprint. When the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed on a front face, a back face, or a side face of the terminal 1200. When a physical button or a vendor logo is disposed on the terminal 1200, the fingerprint 1214 may be integrated with the physical button or the vendor logo.

The optical sensor 1215 is configured to collect ambient light intensity. In an embodiment, the processor 1201 may control display luminance of the touch display screen 1205 according to the ambient light intensity collected by the optical sensor 1215. Specifically, when the ambient light intensity is relatively high, the display luminance of the touch display screen 1205 is increased. When the ambient light intensity is relatively low, the display luminance of the touch display screen 1205 is reduced. In another embodiment, the processor 1201 may further dynamically adjust a camera parameter of the camera component 1206 according to the ambient light intensity collected by the optical sensor 1215.

The proximity sensor 1216, also referred to as a distance sensor, is generally disposed on the front panel of the terminal 1200. The proximity sensor 1216 is configured to collect a distance between the user and the front surface of the terminal 1200. In an embodiment, when the proximity sensor 1216 detects that the distance between the user and the front surface of the terminal 1200 gradually becomes smaller, the touch display screen 1205 is controlled by the processor 1201 to switch from a screen-on state to a screen-off state. In a case that the proximity sensor 1216 detects that the distance between the user and the front surface of the terminal 1200 gradually becomes larger, the touch display screen 1205 is controlled by the processor 1201 to switch from the screen-off state to the screen-on state.

A person skilled in the art may understand that the structure shown in FIG. 12 constitutes no limitation on the terminal 1200, and the terminal may include more or fewer components than those shown in the figure, or some components may be combined, or a different component deployment may be used.

In an embodiment, a terminal is provided, including a processor and a memory, the memory storing a computer program, the computer program, when executed by the processor, causing the processor to perform the operations of the drift method for a virtual vehicle in a virtual world. The operations of the drift method for a virtual vehicle in a virtual world herein may be the operations of the drift method for a virtual vehicle in a virtual world according to the foregoing embodiments.

In an embodiment, a computer-readable storage medium is provided, storing a computer program, the computer program, when being executed by a processor, causing the processor to perform the operations of the foregoing drift method for a virtual vehicle in a virtual world. The operations of the drift method for a virtual vehicle in a virtual world herein may be the operations of the drift method for a virtual vehicle in a virtual world according to the foregoing embodiments.

In an embodiment, a computer-readable storage medium is provided. The computer-readable storage medium is a non-volatile computer-readable storage medium. The computer-readable storage medium stores a computer program. The stored computer program, when executed by a processing component, may implement the drift method for a virtual vehicle in a virtual world provided in the foregoing embodiments of the present disclosure.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The sequence numbers of the foregoing embodiments of the disclosure are merely for description purpose, and do not indicate the preference among the embodiments.

A person of ordinary skill in the art may understand that all or some of the operations of the embodiments may be implemented by hardware, or may be implemented by a program instructing related hardware. The program may be stored in a computer-readable storage medium. The storage medium mentioned above may include: a read-only memory, a magnetic disk, or an optical disc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A drift method for a virtual vehicle in a virtual world, performed by a terminal comprising at least one processor, the method comprising:
   controlling, according to an operation start event, a virtual vehicle to enter a drift state in a virtual world, wherein a vehicle head direction of the virtual vehicle and a traveling direction of the virtual vehicle form an angle;
   in the drift state, applying a control effect on the virtual vehicle to align the vehicle head direction with the traveling direction;
   in response to a direction control operation, steering the vehicle head direction away from the traveling direction to counter the control effect; and
   controlling the virtual vehicle to remain in the drift state based on a determination that the angle between the vehicle head direction and the traveling direction remains greater than or equal to a first threshold.

2. The method according to claim 1, wherein the controlling the virtual vehicle to remain in the drift state comprises:
   increasing a dynamic drift-holding traction on the virtual vehicle along the vehicle head direction, the virtual vehicle being controlled to remain in the drift state based on the dynamic drift-holding traction.

3. The method according to claim 2, wherein a magnitude of the dynamic drift-holding traction is in a positive correlation with a speed of the virtual vehicle in a preset speed range.

4. The method according to claim 2, further comprising:
   changing a ground friction of the virtual vehicle from a first friction value to a second friction value based on the angle between the vehicle head direction and the traveling direction being greater than or equal to the first threshold after an operation end event corresponding to a target interaction control is received,
   the first friction value being greater than the second friction value.

5. The method according to claim 1, further comprising:
   continuously increasing an attribute value of the virtual vehicle during the drift state;
   activating an acceleration control of the virtual vehicle on a user interface based on the attribute value reaching a trigger threshold; and
   based on a trigger signal with respect to the acceleration control being received, controlling the virtual vehicle to accelerate.

6. The method according to claim 1, further comprising:
   based on the angle between the vehicle head direction and the traveling direction being less than the first threshold while the virtual vehicle is in the drift state, controlling the virtual vehicle to restore a normal traveling state.

7. The method according to claim 6, wherein the controlling the virtual vehicle to restore the normal traveling state comprises:
   switching a dynamic drift-holding traction of the virtual vehicle to a normal traveling traction, the virtual vehicle being controlled to remain in the drift state based on the dynamic drift-holding traction, and the virtual vehicle being controlled to enter the normal traveling state based on the normal traveling traction, the dynamic drift-holding traction being greater than the normal traveling traction.

8. The method according to claim 6, further comprising:
changing a ground friction of the virtual vehicle from a second friction value to a first friction value based on the angle between the vehicle head direction and the traveling direction being less than the first threshold while the virtual vehicle is in the drift state, the second friction value being a friction value at which the virtual vehicle remains in the drift state, and
the first friction value being greater than the second friction value.

9. The method according to claim 1, further comprising:
changing the vehicle head direction of the virtual vehicle according to the direction control operation; and
determining an angle between the changed vehicle head direction and the traveling direction.

10. The method according to claim 1, further comprising:
after an operation end event corresponding to a target interaction control is received, controlling the virtual vehicle to switch from the drift state to a normal traveling state upon a lapse of a target duration, based on the angle between the vehicle head direction and the traveling direction being less than a second threshold, the second threshold being less than the first threshold.

11. The method according to claim 10, wherein the controlling the virtual vehicle to switch from the drift state to the normal traveling state upon the lapse of the target duration comprises:
calculating, according to a speed of the virtual vehicle and a ground friction on the virtual vehicle, a decay duration during which the virtual vehicle transitions from the drift state to the normal traveling state;
controlling, based on the decay duration being greater than or equal to a shortest drift duration, the virtual vehicle to transition from the drift state to the normal traveling state according to the decay duration; and
controlling, based on the decay duration being less than the shortest drift duration, the virtual vehicle to transition from the drift state to the normal traveling state according to the shortest drift duration.

12. A drift apparatus for a virtual vehicle in a virtual world, comprising:
at least one memory configured to store program code; and
at least one processor configured to read the program code and operate as instructed by the program code, the program code comprising:
control code configured to cause at least one of the at least one processor to control, according to an operation start event, a virtual vehicle to enter a drift state in the virtual world, wherein a vehicle head direction of the virtual vehicle and a traveling direction of the virtual vehicle form an angle, and in the drift state, apply a control effect on the virtual vehicle to align the vehicle head direction with the traveling direction; and
steering code configured to cause at least one of the at least one processor to, in response to a direction control operation, steer the vehicle head direction away from the traveling direction to counter the control effect,
wherein the control code is further configured to cause at least one of the at least one processor to control the virtual vehicle to remain in the drift state based on a determination that the angle between the vehicle head direction and the traveling direction remains greater than or equal to a first threshold.

13. The apparatus according to claim 12, wherein the control code is further configured to cause at least one of the at least one processor to increase a dynamic drift-holding traction on the virtual vehicle along the vehicle head direction based on the angle between the vehicle head direction and the traveling direction being greater than the first threshold after an operation end event corresponding to a target interaction control is received, the virtual vehicle being controlled to remain in the drift state based on the dynamic drift-holding traction.

14. The apparatus according to claim 12, wherein the control code is further configured to cause at least one of the at least one processor to change a ground friction of the virtual vehicle from a first friction value to a second friction value based on the angle between the vehicle head direction and the traveling direction being greater than or equal to the first threshold after an operation end event corresponding to a target interaction control is received, the first friction value being greater than the second friction value.

15. The apparatus according to claim 12, wherein the control code is further configured to cause at least one of the at least one processor to continuously increase an attribute value of the virtual vehicle during the drift state, activate an acceleration control of the virtual vehicle on a user interface based on the attribute value reaching a trigger threshold, and control the virtual vehicle to accelerate based on a trigger signal with respect to the acceleration control being received.

16. The apparatus according to claim 12, wherein the control code is further configured to cause at least one of the at least one processor to control the virtual vehicle to restore a normal traveling state, based on the angle between the vehicle head direction and the traveling direction being less than the first threshold while the virtual vehicle is in the drift state.

17. The apparatus according to claim 16, wherein the control code is further configured to cause at least one of the at least one processor to switch a dynamic drift-holding traction of the virtual vehicle to a normal traveling traction, the virtual vehicle being controlled to remain in the drift state based on the dynamic drift-holding traction and the normal traveling traction being used for controlling the virtual vehicle to enter the normal traveling state, and the dynamic drift-holding traction being greater than the normal traveling traction.

18. The apparatus according to claim 16, wherein the control code is further configured to cause at least one of the at least one processor to change a ground friction of the virtual vehicle from a second friction value to a first friction value based on the angle between the vehicle head direction and the traveling direction being less than the first threshold while the virtual vehicle is in the drift state, the second friction value being a friction value at which the virtual vehicle remains in the drift state, and the first friction value being greater than the second friction value.

19. A terminal, comprising a processor and a memory, the memory storing computer-readable instructions, the computer-readable instructions, when being executed by the processor, causing the processor to perform operations in the method according to claim 1.

20. A non-transitory computer-readable storage medium, storing computer-readable instructions, the computer-readable instructions, when executed by one or more processors, causing the one or more processors to perform:
controlling, according to an operation start event, a virtual vehicle to enter a drift state in a virtual world, wherein a vehicle head direction of the virtual vehicle and a traveling direction of the virtual vehicle form an angle;

in the drift state, applying a control effect on the virtual vehicle to align the vehicle head direction with the traveling direction;

in response to a direction control operation, steering the vehicle head direction away from the traveling direction to counter the control effect; and controlling the virtual vehicle to remain in the drift state based on a determination that the angle between the vehicle head direction and the traveling direction remains greater than or equal to a threshold.

* * * * *